(12) United States Patent
Gammel et al.

(10) Patent No.: US 8,625,806 B2
(45) Date of Patent: Jan. 7, 2014

(54) DATA-PROCESSING APPARATUS AND METHOD FOR PROCESSING DATA

(75) Inventors: Berndt Gammel, Markt-Schwaben (DE); Oliver Kniffler, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1428 days.

(21) Appl. No.: 11/673,255

(22) Filed: Feb. 9, 2007

(65) Prior Publication Data

US 2007/0189543 A1 Aug. 16, 2007

(30) Foreign Application Priority Data

Feb. 9, 2006 (DE) .......................... 10 2006 006 057

(51) Int. Cl.
*G06F 21/00* (2013.01)

(52) U.S. Cl.
USPC .......................................... 380/286; 713/189

(58) Field of Classification Search
USPC .......................................... 713/189; 380/286
See application file for complete search history.

(56) References Cited

U.S. PATENT DOCUMENTS

| | | | | |
|---|---|---|---|---|
| 2002/0169968 A1* | 11/2002 | Gammel et al. | ............... | 713/189 |
| 2003/0005313 A1* | 1/2003 | Gammel et al. | ............... | 713/189 |
| 2004/0032950 A1* | 2/2004 | Graunke | ......................... | 380/42 |
| 2004/0136530 A1* | 7/2004 | Endo et al. | ..................... | 380/44 |
| 2004/0186979 A1* | 9/2004 | Janke et al. | ..................... | 712/1 |

FOREIGN PATENT DOCUMENTS

| | | |
|---|---|---|
| DE | 102 01 444 A1 | 7/2003 |
| EP | 0 100 954 A2 | 2/1984 |
| EP | 0 100 954 A3 | 2/1984 |
| EP | 0 100 955 | 2/1984 |
| EP | 0 100 955 A3 | 2/1984 |
| EP | 1 118 941 A1 | 7/2001 |
| EP | 1 249 010 B1 | 10/2002 |
| EP | 1 283 458 A2 | 2/2003 |
| EP | 1 472 587 B1 | 11/2004 |
| WO | WO-01/40950 A2 | 6/2001 |
| WO | WO-01/40950 A3 | 6/2001 |

* cited by examiner

*Primary Examiner* — Taghi Arani
*Assistant Examiner* — Tracy Mangialaschi
(74) *Attorney, Agent, or Firm* — Schiff Hardin LLP

(57) ABSTRACT

A data-processing apparatus has a data provider for providing an input datum encrypted by an encryption key. In addition, the data-processing apparatus has a key stream generator for generating a key stream in a predetermined deterministic manner such that the key stream has a decryption key corresponding to the encryption key. Furthermore, the data-processing apparatus has a data processor for processing the encrypted input datum in a masked manner using the decryption key as a temporary key to obtain an output datum encrypted by an output key such that the encrypted output datum corresponds to a result, encrypted by the output key, of a predetermined operation on the encrypted input datum having been decrypted by the decryption key.

13 Claims, 2 Drawing Sheets

DATA-PROCESSING APPARATUS AND METHOD FOR PROCESSING DATA

CROSS-REFERENCE TO RELATED APPLICATION

This application claims priority from German Patent Application No. 10 2006 006 057.1, which was filed on Feb. 9, 2006, and is incorporated herein by reference in its entirety.

BACKGROUND OF THE INVENTION

1. Field of the Invention

The present invention relates to the technical field of cryptography and, in particular, the present invention relates to the technical sub-field of cryptographic bus encryption.

2. Description of Related Art

In order to transfer data from one device to another device on a semiconductor board, signal busses having several parallel lines are frequently used. However, to avoid signal tapping on these bus lines in security-relevant applications, bus encryption is frequently employed so that the data are transferred between the two devices only in an encrypted form. To obtain the information exchanged between the two devices, a potential attacker would have to know the respective encryption key or a pertaining decryption key. Often, a stream cipher is used in the conventional art for this bus encryption.

Such a data transfer by means of bus encryption is illustrated in greater detail in a block circuit diagram in FIG. 2. Here, the (encrypted) data $m_t$ are transferred between a first device CPU and a second device AES by means of a first bus 202 having m bit lines. The two devices schematically illustrated in FIG. 2, however, may also be realized in software, such as, for example, as different routines running in a processor.

Furthermore, (encrypted) data $M_T$ can be transferred from the second device AES via the second bus 204 having m bit lines.

As regards data processing in each of the two devices CPU or AES, the mode of functioning of this processing can be described as follows. The encrypted data of a data stream are received at an input 206 of the first functional block (i.e. of the first device) CPU and decrypted by a decryption key $T_M$ (such as, for example, by an exclusive-OR linking or operation or the like). This decryption key $T_M$ here may be generated by a one-time pad generator OTPG, however, it may, for example, also be taken from a look-up table. This decryption key $T_M$ here corresponds to an encryption key $T_M$ used for encrypting the input data stream on the bus 204 from the functional unit AES. In the present case, the encryption key $T_M$ and the decryption key $T_M$ are identical. As a result of the linking of the encrypted input data with the decryption key in a decrypter 208, plain text data M are output and buffered. For further processing in the functional unit CPU which then is to take place in a masked or encrypted manner, encryption is performed in an encrypter 210 by a T key so that during actual data processing the data are only used in an encrypted/masked form in the functional unit CPU. Subsequently, the processed data are decrypted again by a corresponding T key in a decrypter 212 and encrypted in a subsequent stage (encrypter 214) by another encryption key $t_m$ to be able to transfer same again in an encrypted manner when transferring to the second functional block AES via the first bus 202. The further encryption key $t_m$ may again be a one-time pad.

The processing in the second functional block AES takes place in analogy, i.e. again decryption is performed by a corresponding decryption key $t_m$ which is, for example, also generated by a one-time pad generator OTPG of the further data encryption apparatus, the result being plain text m which is buffered. Again, encryption of the plain text m or the stored version of the plain text m is performed using a T key to execute the actual calculating steps in the functional block AES using the encrypted data.

Subsequently, a value calculated by the functional unit AES is decrypted again, wherein this decrypted value is again produced using the key $T_M$ provided by the one-time pad generator OTPG, the result being the encrypted data stream $M_T$ transferred to the first functional unit CPU via the second bus 204. The overall circuit diagram is illustrated in FIG. 2, this image showing a combination of encrypted data transfer and encrypted calculation.

The realization illustrated in FIG. 2, however, has several problems. First of all, it is to be noted that the greatest problem is that a plain text portion m and M in such a design results from partitioning the bus lines, in particular using the design rule "registered out". In particular, an X bus scramble XBS is used for such a partitioning. For such a bus establishing, all automatic tools for establishing a layout try to preferably place, neutral in timing, gates occurring in the center of a bus line. However, a relatively large portion of the line in a bus line can be tapped by this externally (such as, for example, by a probe), which is particularly disadvantageous when transferring plain text on such a bus line in connection with encrypted transfer and encrypted calculation, since such a "plain text line" has to be considered to be the weakest element in a security-relevant data transfer. Only by means of a complicated hand layout can the plain text portion of the bus lines be kept as small as possible.

Furthermore, a temporary key (T key) has to be generated for the encrypted/masked calculation which, however, can only be achieved by additional hardware and/or numerically complicated additional calculations.

Thirdly, it is also to be mentioned that changing the T key is only possible for an "emptied pipeline", i.e. using a T key on one or several data blocks when calculating in the first functional unit CPU or the second functional unit AES requires applying the key to the respective data block until all corresponding operations have been processed completely.

BRIEF DESCRIPTION OF THE DRAWINGS

An exemplary embodiment of the present invention will be detailed subsequently referring to the appended drawings, in which.

DESCRIPTION OF THE INVENTION

Figure 1:
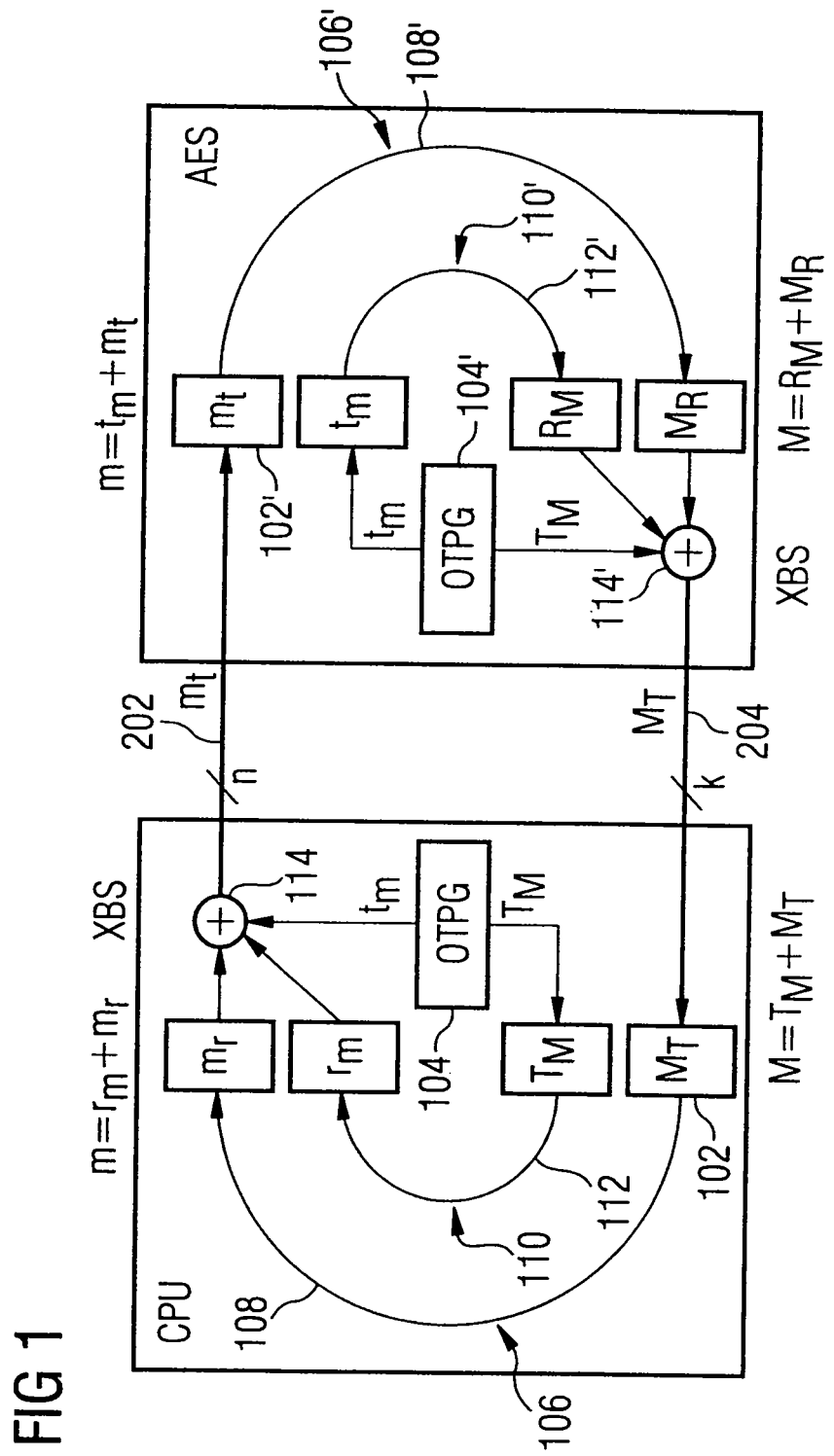
FIG. 1 is a block circuit diagram of an embodiment of the present invention.
Figure 2:
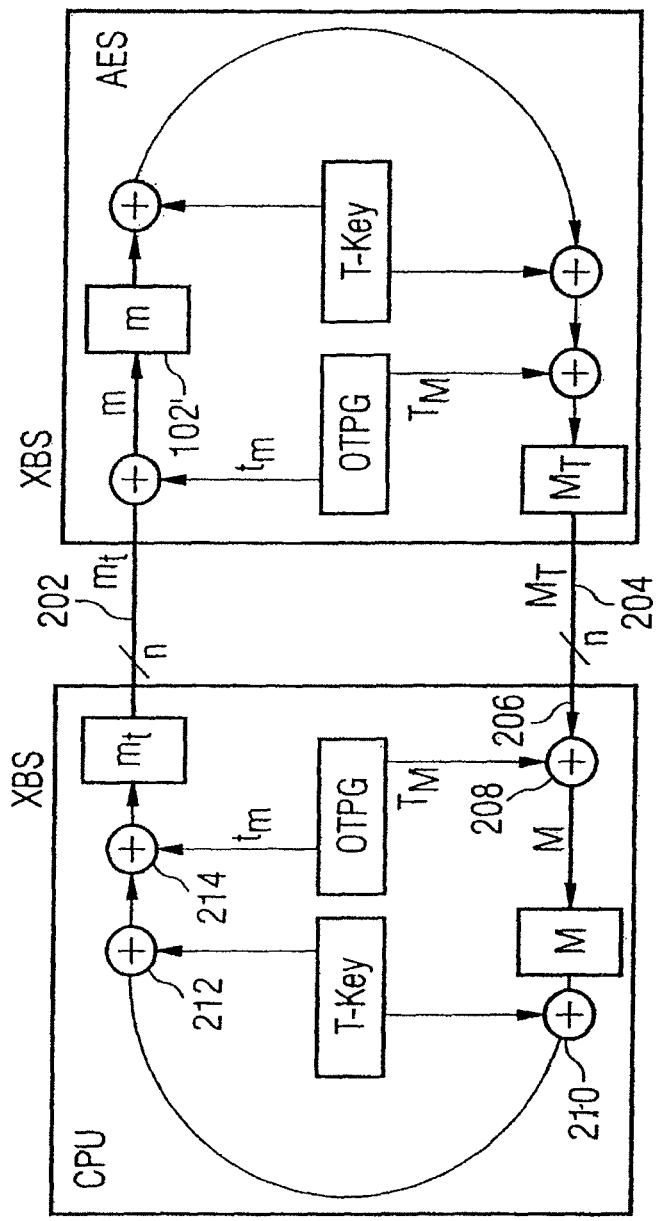
FIG. 2 is a block circuit diagram of a conventional approach for combining encrypted data transfer and encrypted calculation.

The present invention provides an approach which, compared to the conventional art, can be put into practice in a considerably more secure and at the same time more simple way.

In accordance with a first aspect, the present invention provides a data-processing apparatus, having: data-providing means for providing an input datum encrypted by an encryption key; a key stream-generating unit for generating a key stream in a predetermined deterministic manner so that the key stream has a decryption key corresponding to the encryption key; a data-processing unit for processing the encrypted input datum of the decryption key as a temporary key in a masked manner to obtain an output datum encrypted by an output key such that the encrypted output datum corresponds to a result, encrypted by the output key, of a predetermined operation on the encrypted input datum having been decrypted by the decryption key.

In accordance with a second aspect, the present invention provides a bus encryption apparatus, having: a first data-processing apparatus as described above; a second data-processing apparatus as described above; a transfer unit coupled to the first and second data-processing apparatuses such that the data-providing means of the second data-processing unit provides the output datum of the first data-processing unit encrypted by the output key as an encrypted input datum and such that the data-providing means of the first data-processing unit provides the output datum of the second data-processing unit encrypted by the output key as an encrypted input datum, and wherein the key stream-generating unit of the first data-processing unit may be synchronized to the key stream-generating unit of the second data-processing unit such that the encryption key of the second data-processing unit corresponds to the decryption key of the first data-processing unit and the encryption key of the first data-processing unit corresponds to the decryption key of the second data-processing unit.

In accordance with a third aspect, the present invention provides a bus encryption apparatus, having: a data-providing unit for providing an input datum encrypted by an encryption key; a data-processing unit for processing the encrypted input datum in a masked manner using a decryption key as a temporary key to obtain an output datum encrypted by an output key such that the encrypted output datum corresponds to a result, encrypted by the output key, of a predetermined operation on the encrypted input datum having been decrypted by the decryption key; and a key stream-generating unit for generating a key stream and for providing the key stream generated to the data-providing unit and the data-processing unit, the data-providing unit being implemented to obtain the encryption key from the key stream, and the data-processing unit being implemented to obtain the decryption key from the key stream such that the encryption key corresponds to the decryption key.

In accordance with a fourth aspect, the present invention provides a method for processing data by means of a data-processing apparatus, having the steps of: providing an input datum encrypted by an encryption key; generating a key stream in a predetermined deterministic manner so that the key stream has a decryption key corresponding to the encryption key; and processing the encrypted input datum in a masked manner using the decryption key as a temporary key to obtain an output datum encrypted by an output key such that the encrypted output datum corresponds to a result, encrypted by the output key, of a predetermined operation on the encrypted input datum having been decrypted by the decryption key.

In accordance with a fifth aspect, the present invention provides a computer program having a program code for performing the method as described above when the computer program runs on a computer.

The present invention is based on the finding that, to avoid an exposed plain text portion, an input data stream encrypted by an encryption key is not decrypted at first by a decryption key corresponding to the encryption key, but, for example, the data of the encrypted input data stream and the encryption key are processed in two processing branches (preferably in parallel). Only in another transmission will the data from the two processing branches be combined, wherein, for example, at the same time another encryption key is taken into consideration to be able to transfer the combined data to another data-processing means in an encrypted manner. This means that decrypting the data of the encrypted input data stream is omitted, the result being that, on the one hand, no plain text portion results and, on the other hand, no complicated re-encryption using the T key is necessary. At the same time, however, the plain text portion, if necessary, can also be obtained from the corresponding data in the respective processing branches by means of combination (such as, for example, by exclusive-OR linking).

The present invention offers the advantage that no switching has to be done between encryption during transfer and encryption/masking during processing. Further advantages of this are that no re-encryption has to take place between the reception and the calculating unit and that thus no plain text results on any of the lines, which is why no complicated hand layout is necessary additionally for such a circuit and/or chip design. In addition, another advantage is that the inventive approach only requires minimized hardware expenditure by omitting the T key encryption. Furthermore, preferably any started operation for a masked calculation can receive its own key which is independent of the pipeline state in a calculating unit.

Same or similar elements will be provided with same or similar reference numerals in the subsequent description, a repeated explanation of these elements being omitted.

FIG. 1 shows a block circuit diagram of an embodiment of the present invention. Here, a first data encryption apparatus CPU includes data-provider 102 for receiving an input data stream $M_T$ encrypted by an encryption key $T_M$. This data-provider 102 may, for example, be a memory or an input of the first data encryption apparatus CPU. In addition, the first data encryption apparatus includes a key-providing unit 104 for providing a decryption key $T_M$ corresponding to the encryption key $T_M$. The key-providing unit 104 here may be, as is illustrated in FIG. 1, a one-time pad generator OTPG, however, it may also be a memory in which a corresponding symmetrical or asymmetrical decryption key is stored (exemplarily as a look-up table).

Furthermore, the first data encryption apparatus includes a first branch-processing unit 106 implemented to apply a first operation 108 to the data of the encrypted input data stream $M_T$ to obtain first branch data $m_r$. In FIG. 1, the first branch-processing unit 106 is not illustrated explicitly but is only identified by the effect of the first operation 108, i.e. by the arrow illustrated in a broken line provided with the reference numeral 108. The first operation here may be an AND, OR, XOR, NAND, NOR, XNOR operation or any combination of these operations (corresponding to EP 1472587 B1). In analogy, the first data encryption apparatus CPU also includes a second branch data-processing unit 110 implemented to apply a second operation 112 to the decryption key $T_M$ to obtain second branch data $r_m$. Thus, the second operation may be an AND, OR, XOR, NAND, NOR, XNOR operation or any combination of these operations (corresponding to EP 1472587 B1). Again, the second branch data-processing unit 110 is not illustrated explicitly, but only indicated by the effect of the second operation 112 (i.e. by the arrow illustrated in a broken line). The first or second operation may also process and/or combine successive bits to obtain corresponding first or second branch data.

The first or second branch data-processing unit 110, 110' here may be implemented to execute one or a plurality of mathematical sub-operations indicated by the following secret text-calculating rules:

for an AND operation:

$$\text{AND: } r^{(k)} \leftarrow a^{(i)} \cdot b^{(j)} \cdot \bar{j} + \bar{a}^{(i)} \cdot \bar{b}^{(j)} \cdot j + b^{(j)} \cdot \bar{i} \cdot j + \bar{b}^{(j)} \cdot i \cdot \bar{j};$$

for an OR operation:

$$\text{OR: } r^{(k)} \leftarrow a^{(i)} \cdot \bar{b}^{(j)} \cdot \bar{j} + \bar{a}^{(i)} \cdot b^{(j)} \cdot j + b^{(j)} \cdot \overline{i \cdot j} + \bar{b}^{(j)} \cdot i \cdot j;$$

for an NAND operation:

$$\text{NAND: } r^{(k)} \leftarrow \overline{a}^{(i)} \cdot b^{(j)} \cdot \overline{j} + a^{(i)} \cdot \overline{b}^{(j)} \cdot j + b^{(j)} \cdot i \cdot j + \overline{b}^{(j)} \cdot i \cdot \overline{j}$$

for an NOR operation $$\text{NOR: } r^{(k)} \leftarrow \overline{a}^{(i)} \cdot \overline{b}^{(j)} \cdot \overline{j} + a^{(i)} \cdot b^{(j)} \cdot j + b^{(j)} \cdot i \cdot \overline{j} + \overline{b}^{(j)} \cdot \overline{i} \cdot j;$$

for an XOR operation:

$$\text{XOR: } r^{(k)} \leftarrow a^{(i)} \oplus b^{(j)};$$

for an XNOR operation:

$$\text{XNOR: } r^{(k)} \leftarrow \overline{a}^{(i)} \oplus b^{(j)};$$

for a full adder function having the following sum bit:

$$\text{SUM: } r^{(k)} \leftarrow (\overline{a}^{(i)} \oplus j) \oplus (b^{(i)} \oplus j) \oplus c_{in}^{(k)}; \text{ or}$$

for a full adder function having a carry bit:

$$\text{CARRY: } r(k) \leftarrow (\overline{a}^{(i)} \oplus j) \oplus (b^{(i)} \oplus j) + (\overline{a}^{(i)} \oplus j) \cdot c_{in}^{(k)} + (b^{(i)} \oplus j) \cdot c_{in}^{(k)};$$

$a^{(i)}$ being the first operand encrypted by the first encryption parameter, $b^{(j)}$ being the second operand encrypted by the second encryption parameter, i being the first encryption parameter, j being the second encryption parameter, k being the third encryption parameter, the third encryption parameter equaling the XOR linking of the first and second encryption parameters, $r^{(k)}$ being the result of the operation encrypted by the third encryption parameter, and $c_{in}^{(k)}$ being a carry input encrypted by the third encryption parameter. Here, it becomes obvious that linking i and j is, for example, performed as two successive one-time pads of the one-time pad generator 104 by an XOR linking (second operation 112), whereas the input data $a^{(i)}$ and $b^{(j)}$ are not linked alone by an XOR linking (first operation 108), but, for example, by an AND or SUM linking mentioned above. However, it is to be mentioned that, for the operations AND, OR, NAND, NOR, SUM and CARRY, the first or second encryption parameters i and j are to be used in the calculation rule, which is how data exchange between the calculating units executing the first and second operations 112, 108 is to take place in such a case.

Finally, the first data encryption apparatus CPU includes an encrypter 114 implemented to establish an encrypted output data stream $m_t$ from the first branch data $m_r$ and the second branch data $r_m$ using an output-encryption key $t_m$. Here, the encrypter 114 may be implemented to perform an exclusive-OR linking of the corresponding data to obtain the encrypted output data stream $m_t$.

Thus, it is to be mentioned that the one-time pad generated by the one-time pad generator OTPG is a temporary key which is preferably processed synchronously to the masked processing of the encrypted input data in the first branch-processing unit. This means that preferably a one-time pad "datum" is associated with each input datum such that a decryption of the input data processed in a masked manner would be possible. In order to be able to make use of the inventive advantage, however, no decryption of the encrypted input data is performed, so that preferably there are no plain text data exposed in the system (of course except for a direct output of the plain text data to an authorized user).

The second data encryption apparatus AES, as is illustrated in the right part of FIG. 1, may have an analog setup. Here, the corresponding elements are identified by corresponding reference numerals adding an apostrophe.

If data output from the second data encryption device AES in an encrypted form are to be processed in the first data encryption apparatus CPU, at first the encrypted input data stream $M_T$ can be received via the second bus 204 and stored in the data-provider 102. Here, it is to be mentioned that a corresponding decryption $T_M$ which is then provided by the key-providing unit 104 (and, for example, stored in a memory) should be known. It is to be mentioned here that the data stream received may also be encoded by a stream cipher, wherein in this case a stream cipher necessary for decryption can also be provided by the key-providing unit.

In contrast to well-known approaches, however, no decryption of the data provided is performed (wherein the result would be plain text), but rather a parallel processing of both the data of the encrypted input data stream provided and the decryption key is performed. This, on the one hand, takes place in the first branch-processing unit 106 in which the first operation 108 is applied to the data of the encrypted input stream. Correspondingly, the second operation 112 is applied to the decryption key $T_M$ in the second data-processing unit 110. Here, the first or second operation 108 or 112 may include a plurality of sub-operations so that applying the first or second operation 108, 112 can also be considered as executing calculating steps of an algorithm on the respective data. Preferably, however, the first and second operations should correspond to one another so that, for example, the same calculating steps are applied to the data of both the encrypted input data stream and the encryption key, so that a parallel processing (in particular separate and independent on each other) of the respective data can be performed to obtain corresponding branch data.

If the first branch data $m_r$ and the second branch data $r_m$ are present, these branch data can be encrypted in the encrypter 114 using an output encryption key $t_m$ to form an encrypted output data stream $m_t$. Here, the special effect of the inventive approach becomes evident in that no plain text m has to be established here (which would, for example, result by a corresponding linking of the second branch data $r_m$ and the first branch data $m_r$), but at the same time the output encryption key $t_m$ is considered and thus the encrypted output data stream can be established directly without calculating plain text data m.

It is to be mentioned here that the output encryption key $t_m$ may also be a one-time pad which may, for example, be generated as well by the key-providing unit 104. In addition, the output encryption key $t_m$ need not correspond to the decryption key $T_m$ but may, apart from a data sequence (such as, for example, a bit sequence) of a predetermined length, also be a stream cipher using a feedback shift register with a predetermined initial value setting. The same also applies for providing the encryption key $T_M$ which may also be a code word of a predetermined bit length or a stream cipher from a feedback shift register with a predetermined initial value setting, synchronous in clock, wherein these are only two possibilities without limiting the generality for the key-providing unit.

Additionally, the first and second operations 108 and 112 are preferably to be applied to the data of the encrypted data input stream and/or the decryption key such that, when combining the first branch data $m_r$ and the second branch data $r_m$, the result would be a plain text which would also result when applying a predetermined third operation to a plain text M, wherein the plain text M would result from a combination of the decryption key $T_M$ on the data of the (encrypted) input data stream $M_T$. The result is that the first operation 108 and the second operation 112 are to be implemented such that they are parallel executable sub-operations of the third operation, which would correspond to a masked calculation within the data encryption apparatus when directly generating plain text M.

However, executing the encrypter 114 may also take place as an alternative to an XOR linking, such as, for example, by a symmetrical or asymmetrical encryption, wherein in this case the output encryption key $t_m$ would be a symmetrical key and/or a public (or private) key, depending on whether public signing and private verifying or private signing and public verifying is to be performed.

By way of analogy, the data output from the first data encryption apparatus CPU via the first bus 202 can be received in a second data encryption apparatus AES and stored in a data-providing memory 102'. Correspondingly, the data of the encrypted output data stream $m_t$ of the first data encryption apparatus CPU form the data of the encrypted input data stream of the second data encryption apparatus AES. In analogy, the second data encryption apparatus AES in turn includes a key-providing unit 104' for providing a decryption key $t_m$ corresponding to the encryption key $t_m$, wherein the key-providing unit 104' of the second data encryption apparatus AES in turn may be a one-time pad generator OTPG. In analogy to the first data encryption apparatus CPU, the second data encryption apparatus AES also includes a first branch-processing unit 106' implemented to apply a first operation 108' to the data of the encrypted input data stream $m_t$ to obtain first branch data $M_R$. In addition, the second data-processing apparatus AES also includes a second branch data-processing unit 110' implemented to apply a second operation 112' to the decryption key $t_m$ to obtain second branch data $R_M$. Finally, the second data encryption apparatus AES includes an encrypter 114' selected to establish an encrypted output data stream $M_T$ from the first branch data $M_R$ and the second branch data $R_M$ using an output encryption key $T_M$. The output encryption key $T_M$ of the second data encryption apparatus here may again be provided by a key-providing unit 104' and may, for example, again be a one-time pad.

It is to be mentioned here that, according to the embodiment illustrated in FIG. 1, the key-providing unit 104 of the first data encryption apparatus and the key-providing unit 104' of the second data encryption apparatus may each be a one-time pad generator. In this case, the one-time pads for encryption and decryption may be identical, i.e. the output encryption key $T_M$ of the second data encryption apparatus may be equal to the decryption key of the first data encryption apparatus CPU. Alternatively, as has been explained above, however, a corresponding symmetrical or asymmetrical encryption may be used. The same applies to the output encryption key $t_m$ of the first data encryption apparatus and the decryption key $t_m$ of the second data encryption apparatus AES. It is possible by this to perform the encryption on the basis of, for example, an initial value substitution of a shift register serving as the key-providing unit 104 and/or 104', which is how an encryption algorithm which is simple as far as numeric and/or hardware is concerned may be implemented. It is also to be pointed out here that in the second data encryption apparatus AES, too, no plain text occurs neither in the receive branch (i.e. no combination of the decryption key $t_m$ and the data of the encrypted input stream $m_t$ takes place to obtain the plain text m) nor in the transmit branch, such as, for example, by linking the first branch data $M_R$ and the second branch data $R_M$ to obtain the plain text M. This means that again the problems resulting from the plain text are avoided and additionally no re-encryption is necessary.

It also has to be mentioned that, in particular when using linear first and/or second operations, a simplification in pipelining is possible since in this case a temporally matching provision of the decryption key and/or a part (segment) of an encryption key for corresponding data of the encrypted data stream is allowed and these data can each be subject to the first and/or second operations without preceding and/or subsequent operating steps corrupting the result.

The units "CPU" and "AES" shown in the block circuit diagram illustrated in FIG. 1, however, are only representative of a plurality of different data-processing units. These data-processing units may include a microprocessor, a co-processor, another CPU, a cryptography processor (such as, for example, for symmetrical algorithms, like AES or DES, or asymmetrical algorithms, like RSA, elliptical curves cryptography, etc.) or different calculating units.

As another generalization, the inventive concept may also be applied to communication between several communication partners. Exemplarily, the concept also works for more than two communication partners A, B, C (when, for example, in FIG. 1 partner A is the unit CPU and partner B is the unit AES), wherein in this case A may be connected to B and furthermore A may be connected to C (exemplarily of another AES unit), wherein unit A may then be the master. Thus, the configuration illustrated in FIG. 1 is only one form of interconnecting the individual units, wherein an interconnection of several units may also be implemented in the form of a bus system transferring data between the more than two connected units in an encrypted manner.

Also, an encryption stream may be generated outside the data-processing units CPU and AES illustrated in FIG. 1 and then be fed to two such units via a common signal line. Here, no synchronization of the one-time pad generators would have to take place since the synchronized receiving of the key stream already guarantees such a synchronization. The masked processing of encrypted input data, however, is not impeded by such an external feeding of a key stream from which an encryption key and a corresponding decryption key are generated.

Depending on the circumstances, the inventive method may be implemented in either hardware or software. The implementation may take place on a digital storage medium, in particular on a disc or CD having control signals which can be read out electronically, which can cooperate with a programmable computer system such that the corresponding method will be executed. In general, the invention is thus also in a computer program product having a program code stored on a machine-readable carrier for performing the inventive method when the computer program product runs on a computer. Put differently, the invention may also be realized as a computer program having a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A data-processing apparatus comprising:
a data provider implemented to provide an input datum encrypted by an encryption key;
a key stream generator implemented to generate a key stream in a predetermined deterministic manner such that the key stream sequentially comprises a decryption key corresponding to the encryption key and an output key; and
a data processor implemented to process the encrypted input datum in a masked manner using the decryption key as a temporary key to obtain an output datum encrypted by the output key such that the encrypted output datum corresponds to a result, encrypted by the output key, of a predetermined operation on the encrypted input datum having been decrypted by the decryption key, wherein the data processor comprises a first branch data processor implemented to apply a first mathematical or logical operation to the encrypted input datum to obtain first branch data which corresponds to a result, encrypted by second branch data, of the predetermined operation on the encrypted input datum having been decrypted by the decryption key;

a second branch data processor implemented to apply a second mathematical or logical operation to the decryption key to obtain the second branch data, the first mathematical or logical operation and the second mathematical or logical operation being separated from each other in that the first mathematical or logical operation does neither involve the decryption key nor any data derived from the decryption key, and the second mathematical or logical operation does neither depend on the encrypted input datum nor any data derived from the encrypted input datum; and an XOR generator implemented to generate the encrypted output datum by XORing the first branch data, the second branch data and the output key, wherein the first branch data processor and the second branch data processor are implemented to execute as a first operation and as a second operation operational steps corresponding to operational steps of a third operation which would be applied to generate second plain text data from first plain text data, wherein the first plain text data would correspond to that data which would correspond to a decryption of the data of the encrypted input data stream by the decryption key and the second plain text data would correspond to a combination of the first branch data and the second branch data.

2. The data-processing apparatus according to claim 1, wherein the key stream generator includes a key generator implemented to generate the decryption key.

3. The data-processing apparatus according to claim 2, wherein the key generator is a one-time pad generator.

4. The data-processing apparatus according to claim 1, wherein the first branch data processor and the second branch data processor are implemented to execute as a first operation and as a second operation operational steps with the same operational rule.

5. The data-processing apparatus according to claim 1, wherein the first branch data processor is implemented to apply a first sub-operation to a first data segment of the encrypted input data stream and to apply a second sub-operation to a second data segment of the data of the encrypted input data stream, and wherein a first encryption key is associated with the data of the first segment of the encrypted input data stream and a second encryption key is associated with the data of the second data segment of the encrypted input data stream.

6. The data-processing apparatus according to claim 1, wherein the data processor and the branch data processor are configured such that the first operation is different from the second operation.

7. A bus encryption apparatus, comprising:

a first data-processing apparatus and a second data-processing apparatus, each comprising a key stream generator and a data processor, wherein in the first data-processing apparatus, the key stream generator is implemented to generate a key stream in a predetermined deterministic manner such that the key stream sequentially comprises a decryption key equal to the encryption key, and an output key; and the data processor is implemented to process an encrypted input datum encrypted by an encryption key and received from the data processor of the second data-processing apparatus, in a masked manner using the decryption key as a temporary key to obtain an output datum encrypted by an output key such that the encrypted output datum corresponds to a result, encrypted by the output key, of a predetermined operation on the encrypted input datum having been decrypted by the decryption key, wherein the data processor of the first data-processing apparatus comprises a first branch data processor implemented to apply a first mathematical or logical operation to the encrypted input datum to obtain first branch data which corresponds to a result, encrypted by second branch data, of the predetermined operation on the encrypted input datum having been decrypted by the decryption key, a second branch data processor implemented to apply a second mathematical or logical operation to the decryption key to obtain the second branch data, the first mathematical or logical operation and the second mathematical or logical operation being separated from each other in that the first mathematical or logical operation does neither involve the decryption key nor any data derived from the decryption key, and the second mathematical or logical operation does neither depend on the encrypted input datum nor any data derived from the input datum; and an XOR operator implemented to generate the encrypted output datum by XORing the first branch data, the second branch data and the output key;

wherein in the second data-processing apparatus, the key stream generator is implemented to generate a key stream in a predetermined deterministic manner such that the key stream sequentially comprises the decryption key corresponding to the encryption key, the output key and a further output key; and the data processor is implemented to process the output datum received from the data processor of the first data-processing apparatus in a masked manner using the output key as a temporary key to obtain a further output datum encrypted by the further output key such that the further encrypted output datum corresponds to a further result, encrypted by the further output key, of a further predetermined operation on the encrypted output datum having been decrypted by the output key, wherein the data processor of the second data-processing apparatus comprises a third branch data processor implemented to apply a third mathematical or logical operation to the output datum to obtain third branch data which corresponds to a result, encrypted by fourth branch data, of the further predetermined operation on the encrypted input datum having been decrypted by the decryption key, a fourth branch data processor implemented to apply a fourth mathematical or logical operation to the output key to obtain fourth branch data, the third mathematical or logical operation and the fourth mathematical or logical operation being separated from each other in that the third mathematical or logical operation does neither involve the output key nor any data derived from the decryption key, and the fourth mathematical or logical operation does neither depend on the encrypted output datum nor any data derived from the encrypted output datum, and an XOR operator implemented to generate the further encrypted output datum by XORing the third branch data, the fourth branch data and the further output key;

wherein the key stream generator of the first data-processing apparatus and the key stream generator of the second data-processing apparatus are synchronized.

8. The bus encryption apparatus according to claim 7, wherein the data processor is configured to process the encrypted input datum in a masked manner using the decryption key as the temporary key such that no plain text data intermediately results from the input datum within the data processor.

9. A bus encryption apparatus, comprising:
a data provider implemented to provide an input datum encrypted by an encryption key;
a data processor implemented to process the encrypted input datum in a masked manner using a decryption key as a temporary key to obtain an output datum encrypted by an output key such that the encrypted output datum corresponds to a result, encrypted by the output key, of a predetermined operation on the encrypted input datum having been decrypted by the decryption key, wherein the data processor comprises a first branch data processor implemented to apply a first mathematical or logical operation to the encrypted input datum to obtain first branch data which corresponds to a result, encrypted by second branch data, of the predetermined operation on the encrypted input datum having been decrypted by the decryption key, a second branch data processor implemented to apply a second mathematical or logical operation to the decryption key to obtain second branch data, the first mathematical or logical operation and the second mathematical or logical operation being separated from each other in that the first mathematical or logical operation does neither involve the decryption key nor any data derived from the decryption key, and the second mathematical or logical operation does neither depend on the encrypted input datum nor any data derived from the encrypted input datum, and an XOR operator implemented to generate the encrypted output datum by XORing the first branch data, the second branch data and the output key; and
a key stream generator implemented to generate a key stream and to provide the key stream generated to the data provider and the data processor, the data provider being implemented to obtain the encryption key from the key stream, and the data processor being implemented to obtain the decryption key from the key stream such that the encryption key corresponds to the decryption key,
wherein the first branch data processor and the second branch data processor are implemented to execute as a first operation and as a second operation operational steps corresponding to operational steps of a third operation which would be applied to generate second plain text data from first plain text data, wherein the first plain text data would correspond to that data which would correspond to a decryption of the data of the encrypted input data stream by the decryption key and the second plain text data would correspond to a combination of the first branch data and the second branch data.

10. The bus encryption apparatus according to claim 9, wherein the data processor is configured to process the encrypted input datum in a masked manner using the decryption key as the temporary key such that no plain text data intermediately results from the input datum within the data processor.

11. A method for processing data by means of a data-processing apparatus, comprising:
providing an input datum encrypted by an encryption key;
generating a key stream in a predetermined deterministic manner so that the key stream sequentially comprises a decryption key corresponding to the encryption key and an output key; and
processing the encrypted input datum using the decryption key as a temporary key to obtain an output datum encrypted by the output key such that the encrypted output datum corresponds to a result, encrypted by the output key, of a predetermined operation on the encrypted input datum having been decrypted by the decryption key, wherein the processing comprises
applying a first mathematical or logical operation to the encrypted input datum to obtain first branch data which corresponds to a result, encrypted by second branch data, of the predetermined operation on the encrypted input datum having been decrypted by the decryption key,
applying a second mathematical or logical operation to the decryption key to obtain the second branch data, the first mathematical or logical operation and the second mathematical or logical operation being separated from each other in that the first mathematical or logical operation does neither involve the decryption key nor any data derived from the decryption key, and the second mathematical or logical operation does neither depend on the encrypted input datum nor any data derived from the encrypted input datum,
generating the encrypted output datum by XORing the first branch data, the second branch data and the output key; and
executing as a first operation and as a second operation operational steps corresponding to operational steps of a third operation which would be applied to generate second plain text data from first plain text data, wherein the first plain text data would correspond to that data which would correspond to a decryption of the data of the encrypted input data stream by the decryption key and the second plain text data would correspond to a combination of the first branch data and the second branch data.

12. A non-transitory computer-readable medium having stored thereon a computer program comprising a program code for performing a method for processing data by means of a data-processing apparatus, comprising:
providing an input datum encrypted by an encryption key;
generating a key stream in a predetermined deterministic manner so that the key stream sequentially comprises a decryption key corresponding to the encryption key and an output key; and
processing the encrypted input datum using the decryption key as a temporary key to obtain an output datum encrypted by the output key such that the encrypted output datum corresponds to a result, encrypted by the output key, of a predetermined operation on the encrypted input datum having been decrypted by the decryption key, the processing comprising
applying a first mathematical or logical operation to the encrypted input datum to obtain first branch data which corresponds to a result, encrypted by second branch data, of the predetermined operation on the encrypted input datum having been decrypted by the decryption key,
applying a second mathematical or logical operation to the decryption key to obtain the second branch data, the first mathematical or logical operation and the second mathematical or logical operation being separated from each other in that the first mathematical or logical operation does neither involve the decryption key nor any data derived from the decryption key, and the second mathematical or logical operation does neither depend on the encrypted input datum nor any data derived from the encrypted input datum, generating the encrypted output datum by XORing the first branch data, the second branch data and the output key, when the computer program runs on a computer, and executing as a first operation and as a second operation operational steps corresponding to operational steps of a third operation which would be applied to generate second plain text data from first plain text data, wherein the first plain text data would correspond to that data which would correspond to a decryption of the data of the encrypted input data stream by the decryption key and the second plain text data would correspond to a combination of the first branch data and the second branch data.

13. A data-processing apparatus, comprising:

data providing means for providing an input datum encrypted by an encryption key;

a key stream generating means for generating a key stream in a predetermined deterministic manner such that the key stream comprises a decryption key corresponding to the encryption key; and a data processing means for processing the encrypted input datum in a masked manner using the decryption key as a temporary key to obtain an output datum encrypted by an output key such that the encrypted output datum corresponds to a result, encrypted by the output key, of a predetermined operation on the encrypted input datum having been decrypted by the decryption key, wherein the data processing means comprises a first branch data processor implemented to apply a first mathematical or logical operation to the encrypted input datum to obtain first branch data which corresponds to a result, encrypted by second branch data, of the predetermined operation on the encrypted input datum having been decrypted by the decryption key, and a second branch data processor implemented to apply a second mathematical or logical operation to the decryption key to obtain the second branch data, the first mathematical or logical operation and the second mathematical or logical operation being separated from each other in that the first mathematical or logical operation does neither involve the decryption key nor any data derived from the decryption key, and the second mathematical or logical operation does neither depend on the encrypted input datum nor any data derived from the encrypted input datum; and an XOR operator implemented to generate the encrypted output datum by XORing the first branch data, the second branch data and the output key, wherein the first branch data processor and the second branch data processor are implemented to execute as a first operation and as a second operation operational steps corresponding to operational steps of a third operation which would be applied to generate second plain text data from first plain text data, wherein the first plain text data would correspond to that data which would correspond to a decryption of the data of the encrypted input data stream by the decryption key and the second plain text data would correspond to a combination of the first branch data and the second branch data.

* * * * *